(12) United States Patent
Usami

(10) Patent No.: US 12,434,424 B2
(45) Date of Patent: Oct. 7, 2025

(54) MOLD FOR BLOW MOLDING, METHOD FOR MANUFACTURING RESIN CONTAINER USING SAME, AND RESIN CONTAINER

(71) Applicant: NISSEI ASB MACHINE CO., LTD., Nagano (JP)

(72) Inventor: Masayuki Usami, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

(21) Appl. No.: 18/594,632

(22) Filed: Mar. 4, 2024

(65) Prior Publication Data
US 2024/0286338 A1 Aug. 29, 2024

Related U.S. Application Data

(62) Division of application No. 17/260,720, filed as application No. PCT/JP2019/027947 on Jul. 16, 2019, now Pat. No. 11,951,670.

(30) Foreign Application Priority Data

Jul. 17, 2018 (JP) .................................. 2018-134579

(51) Int. Cl.
*B29C 49/48* (2006.01)
*B29C 49/12* (2006.01)
(Continued)

(52) U.S. Cl.
CPC .............. *B29C 49/48* (2013.01); *B29C 49/12* (2013.01); *B29C 49/14* (2013.01); *B65D 1/023* (2013.01);
(Continued)

(58) Field of Classification Search
None
See application file for complete search history.

(56) References Cited

U.S. PATENT DOCUMENTS

| 5,178,817 A | 1/1993 | Yamada et al. |
| 5,662,842 A | 9/1997 | Sadr et al. |
| 2018/0029280 A1 | 2/2018 | Morikami |

FOREIGN PATENT DOCUMENTS

| CN | 107614239 | 1/2018 |
| JP | 1-264808 | 10/1989 |

(Continued)

OTHER PUBLICATIONS

Nakamura JP2006062110A English Translation 2006 (Year: 2006).*

(Continued)

*Primary Examiner* — Jacob T Minskey
*Assistant Examiner* — Adrien J Bernard
(74) *Attorney, Agent, or Firm* — Greenblum & Bernstein, P.L.C.

(57) ABSTRACT

A blow molding mold in which a holding mechanism is independently provided to a bottom mold and is configured to be capable of gripping a protruding portion provided to a bottom portion of a preform independently of a gate portion, and a rotation mechanism is configured to be capable of rotating the bottom mold, relative to a neck portion of the preform which is in a stationary state held by neck molds, in a state where the protruding portion is gripped by the holding mechanism.

6 Claims, 7 Drawing Sheets

(51) Int. Cl.
 *B29C 49/14* (2006.01)
 *B65D 1/02* (2006.01)
 *B29L 31/00* (2006.01)

(52) U.S. Cl.
 CPC .... *B65D 1/0261* (2013.01); *B29C 2049/4861* (2013.01); *B29C 2049/4881* (2022.05); *B29C 2049/4889* (2013.01); *B29L 2031/7158* (2013.01)

(56) References Cited

FOREIGN PATENT DOCUMENTS

| JP | 2-70420 | | 3/1990 | |
|----|---------|---|--------|---|
| JP | 2-86424 | | 3/1990 | |
| JP | 3-73316 | | 3/1991 | |
| JP | 2002-67130 | | 3/2002 | |
| JP | 2005-007786 | | 1/2005 | |
| JP | 2006-62110 | | 3/2006 | |
| JP | 2006062110 A | * | 3/2006 | ......... B29C 2949/22 |
| JP | 4093562 | | 6/2006 | |
| JP | 3893054 | | 3/2007 | |
| JP | 5103247 | | 12/2012 | |
| JP | 2018-30629 | | 3/2018 | |
| JP | 2018030629 A | * | 3/2018 | ............... B65D 1/02 |

OTHER PUBLICATIONS

Sekine JP2018030629A English Translation 2018 (Year: 2018).*
Written Opinion of the International Searching Authority issued in International Application No. PCT/JP2019/027947, dated Oct. 8, 2019, along with an English translation thereof.
International Search Report issued in International Patent Application No. PCT/JP2019/027947, dated Oct. 8, 2019, along with an English translation thereof.
Office Action issued in Taiwanese Counterpart Patent Appl. No. 108125251, dated Mar. 4, 2020, along with English Translation thereof.
Office Action issued in the corresponding Korean patent application No. 10-2021-7004532 dated Jan. 27, 2022 along with English translation thereof.
Office Action issued in Chinese Patent Application No. 201980059898.0 dated May 5, 2022, along with English translation thereof.
Office Action issued to Chinese Patent Application No. 201980059898.0 dated Nov. 18, 2022, along with English translation thereof.

* cited by examiner

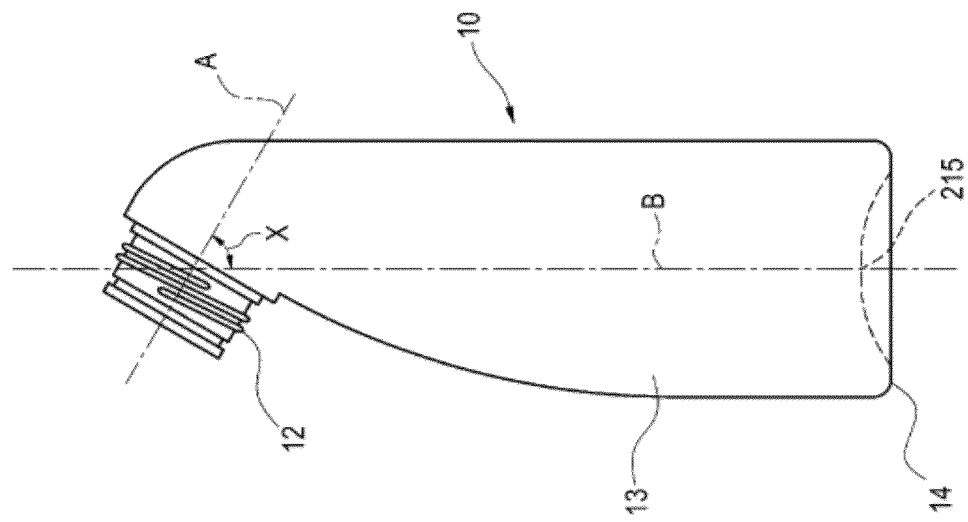
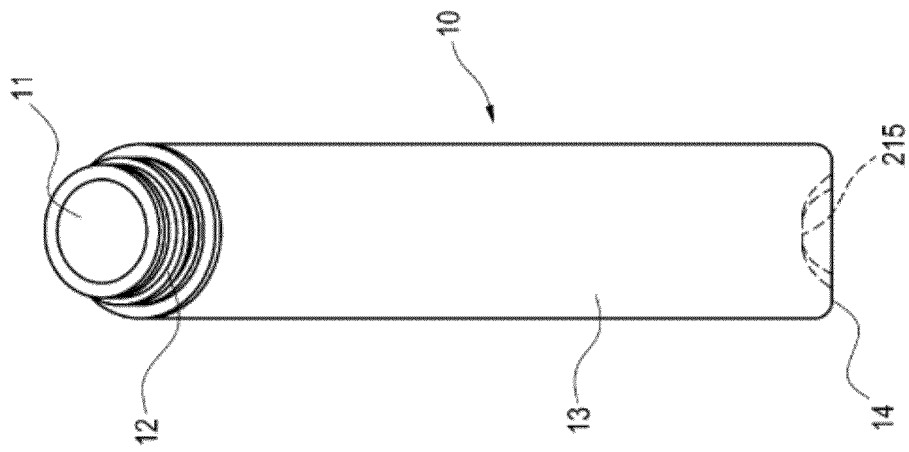

MOLD FOR BLOW MOLDING, METHOD FOR MANUFACTURING RESIN CONTAINER USING SAME, AND RESIN CONTAINER

CROSS-REFERENCE TO RELATED APPLICATIONS

This is a Divisional of U.S. patent application Ser. No. 17/260,720, filed Jan. 15, 2021, which is a National Stage Entry of Int. Pat. Appl. No. PCT/JP2019/027947, filed Jul. 16, 2019, which claims the benefit of Jap. Pat. Appl. No. 2018-134579, filed Jul. 17, 2018. The disclosure of each of the above-mentioned documents, including the specification, drawings, and claims, is incorporated herein by reference in its entirety.

TECHNICAL FIELD

The present invention relates to a blow molding mold, a method for manufacturing a resin container using the same, and a container made of resin.

BACKGROUND ART

Patent Literature 1, Patent Literature 2 and Patent Literature 3 disclose a stretch blow molding method. Patent Literature 4 discloses a direct blow molding method.

CITATION LIST

Patent Literature

[Patent Literature 1] JP-A-2006-062110
[Patent Literature 2] Japanese Patent No. 5,103,247
[Patent Literature 3] Japanese Patent No. 3,893,054
[Patent Literature 4] Japanese Patent No. 4,093,562

SUMMARY OF INVENTION

Technical Problem

Examples of a container that is manufactured by blow molding include a container with a bent neck where a central axis of a neck portion is inclined relative to a central axis of a body portion. A container where an inclination angle of a neck portion is small can also be manufactured by stretch blow molding by using an inclination stretch mechanism disclosed in Patent Literature 1, Patent Literature 2 and Patent Literature 3. However, since a container in which an inclination angle of a neck portion is large (for example, 60° or larger) is substantially impossible to be manufactured by the inclination stretch mechanism, such container is manufactured by the direct blow molding disclosed in Patent Literature 4.

On the other hand, the container that can be manufactured by the direct blow molding is generally inferior to the container manufactured by the stretch blow molding in terms of aesthetic appearance. There is an increasing desire to manufacture a container with a bent neck having a large inclination angle by the stretch blow molding.

It is therefore an object of the present invention to provide a blow molding mold capable of manufacturing a container with a bent neck having a large inclination angle by stretch blow molding, a method for manufacturing a resin container using the same, and a container made of resin.

Solution to Problem

A blow molding mold of the present invention capable of achieving the above object is a blow molding mold including:
  a bottom mold;
  a neck mold;
  a holding mechanism; and
  a rotation mechanism,
  in which the holding mechanism is independently provided to the bottom mold and is configured to be capable of gripping a protruding portion provided to a bottom portion of a preform independently of a gate portion, and
  the rotation mechanism is configured to be capable of rotating the bottom mold, relative to a neck portion of the preform in a stationary state held by the neck mold, in a state where the protruding portion is gripped by the holding mechanism.

According to the blow molding mold configured as described above, it is possible to manufacture a container with a bent neck having a large inclination angle by stretch blow molding.

A method for manufacturing a resin container according to the present invention includes:
  a holding process of gripping a protruding portion, which is provided to a bottom portion of a preform accommodated in a blow molding mold independently of a gate portion, by a holding mechanism independently provided to a bottom mold of the blow molding mold, in a state where split molds of the blow molding mold are opened;
  a bending process of bending the preform by rotating the bottom mold which is gripping the protruding portion relative to a neck portion of the preform which is in a stationary state held by a neck mold; and
  a blowing process of closing the split molds and stretching the preform by a pressurizing medium.

According to the blow molding method of a resin container configured as described above, it is possible to manufacture a container with a bent neck having a large inclination angle by a method other than direct blow molding.

It is preferable that the method for manufacturing a resin container according to the present invention includes a preliminary stretching process of stretching the bottom portion of the preform toward the bottom mold by a stretch rod before the holding process.

According to the blow molding method of a resin container configured as described above, it is possible to manufacture a container with a bent neck having a large inclination angle by stretch blow molding.

A container of the present invention is a container made of resin, including:
  a neck portion having an opening;
  a body portion formed to be continuous to the neck portion and defining a sidewall part; and
  a bottom portion formed to be continuous to the body portion,
  in which an inclination angle between an axis passing through a center of the opening and orthogonal to an opening surface formed by the opening and an axis extending in a vertical direction of the container is equal to or larger than 50° and equal to or smaller than 80°, and
  when a direction extending in a horizontal diametrical direction of the opening is referred to as a width direction of the container and a direction in which an axis orthogonal to the opening surface formed by the opening extends is referred to as a depth direction of the container, a length in the width direction and a length in the depth direction of a horizontal section of the body portion are different from each other.

In the container, it is preferable that:
the bottom portion includes a projecting portion projecting outward from an outer surface of the bottom portion.

In the container, it is preferable that:
the body portion includes an upper body portion having an inclined surface portion inclined along a direction orthogonal to the axis orthogonal to the opening surface formed by the opening, and a lower body portion connected to the upper body portion and extending in the vertical direction,
horizontal sections of the upper body portion and the lower body portion have polygonal shapes, and
a number of corners of the polygonal shape of the horizontal section of the upper body portion is smaller than a number of corners of the polygonal shape of the horizontal section of the lower body portion.

Advantageous Effects of Invention

According to the present invention, it is possible to provide the blow molding mold capable of manufacturing a container with a bent neck having a large inclination angle by the stretch blow molding, the method for manufacturing a resin container using the same, and a container made of resin.

BRIEF DESCRIPTION OF DRAWINGS

FIG. 1(a) and FIG. 1(b) depict a container with a bent neck having a large inclination angle, in which FIG. 1(a) is a left side view of the container and FIG. 1(b) is a front view of the container.

FIG. 3(a), FIG. 3(b), FIG. 3(c), and FIG. 3(d) depict an outer shape of a preform, in which FIG. 3(a) is a front view of the preform, FIG. 3(b) is a left side view of the preform, FIG. 3(c) is a partially enlarged front view of the preform, and FIG. 3(d) is a partially enlarged left side view of the preform.

FIG. 4(a) and FIG. 4(b) depict a blow molding mold, in which FIG. 4(a) is a front view of the mold, and FIG. 4(b) is a left side view of the mold.

FIG. 6(a), FIG. 6(b), and FIG. 6(c) depict an aspect of blow molding, in which FIG. 6(a) depicts an aspect where a preform is accommodated in a mold in a state where split molds (not shown) are opened, FIG. 6(b) depicts a state where a protruding portion of the preform is gripped by the holding mechanism, and FIG. 6(c) depicts a state where the preform is bent.

FIG. 7(a), FIG. 7(b), FIG. 7(c), FIG. 7(d), and FIG. 7(e) depict an aspect of a container with a bent neck having a large inclination angle, in which FIG. 7(a) depicts the container, as seen from an opening-side, FIG. 7(b) depicts a front appearance of the container, FIG. 7(c) depicts a right side appearance of the container, FIG. 7(d) is a sectional view of the container taken along a line E-E, and FIG. 7(e) is a sectional view of the container taken along a line F-F.

DESCRIPTION OF EMBODIMENTS

Figure 2:
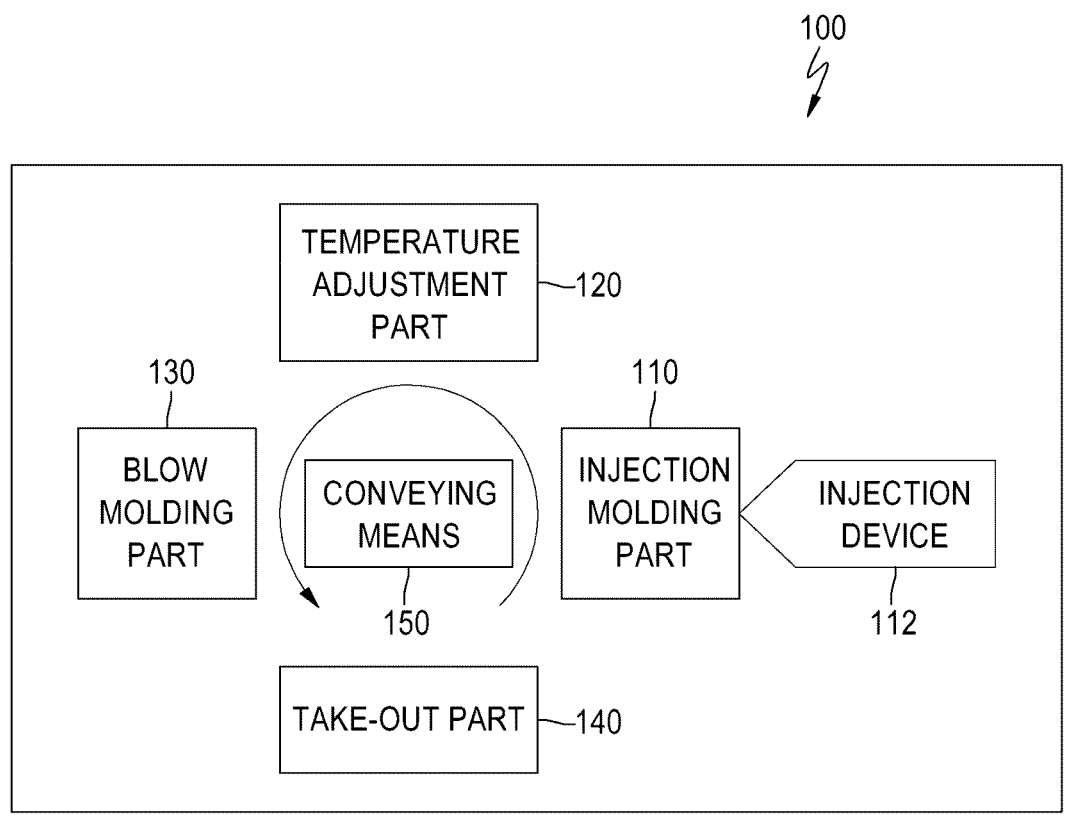
FIG. 2 is a functional block diagram of a blow molding device.
Figure 3A:
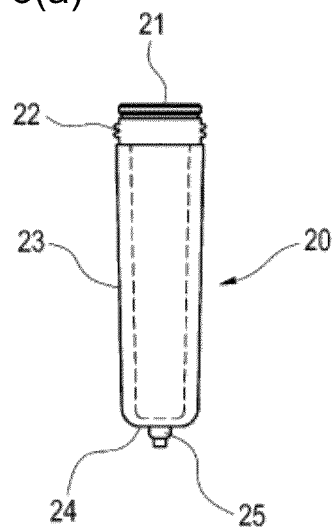
Figure 3B:
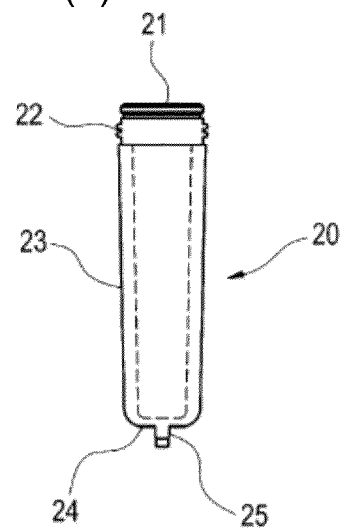
Figure 3C:
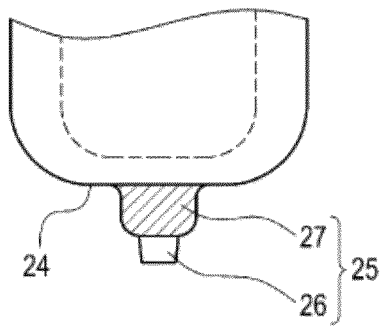
Figure 3D:
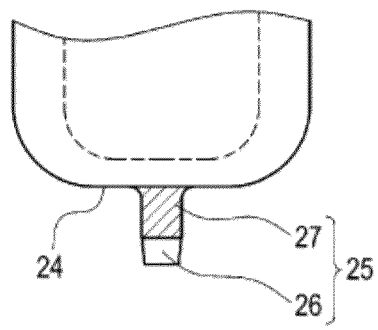

Hereinbelow, embodiments of the present invention will be described with reference to the drawings. Note that, the sizes of the members shown in the drawings may be different from the sizes of the actual members, for convenience of descriptions.

First, a container 10 with a bent neck of the present embodiment is described with reference to FIG. 1. (a) of FIG. 1 is a left side view of the container 10, and (b) of FIG. 1 is a front view of the container 10. The container 10 is a container made of resin and includes a neck portion 12 having an opening 11, a body portion 13 formed to be continuous to the neck portion 12 and defining a sidewall part of the container 10, and a bottom portion 14 formed to be continuous to the body portion 13. The bottom portion 14 has an outer edge portion formed to have a horizontal surface shape and serving as a ground contacting surface, and an upper bottom portion depressed toward the body portion 13 and forming a concave portion. An outer surface of the bottom portion 14 (upper bottom portion) is provided with a projecting portion (projection trace portion) 215 (not shown) within a range of a depth of the depression of the bottom portion 14 (a depth of the upper bottom portion). In the present embodiment, an angle between an axis A passing through a center of the opening 11 of the neck portion 12 and orthogonal to an opening surface and an axis B extending in a vertical direction of the container 10 is referred to as an inclination angle X. In the present example, the inclination angle X of the container 10 is large, for example, substantially 60°. When bisecting the body portion 13 in the vertical direction, an upper portion is substantially triangular in a front view ((b) of FIG. 1). A part of the body portion 13 connected to the neck portion 12 at an upper position in the vertical direction is bent, and a part of the body portion 13 connected to the neck portion 12 at a lower position in the vertical direction extends parallel to the opening surface ((b) of FIG. 1). Note that, a traverse section in the horizontal direction of the body portion 13 may have any shape among a flat shape, a substantially elliptical shape, a substantially true circular shape, and a polygonal shape (a flat shape, in the container 10 of FIG. 1). In the present example, a height of the container 10 is about 13 cm, a width is about 3 cm, and a depth is about 4 cm. Note that, in the container 10 and a container 10A to be described later, the width indicates a length in a minor axis direction (minor radius direction) of the horizontal cross section of the body portion 13 or the bottom portion 14, and the depth indicates a length in a major axis direction (minor radius direction) of the horizontal cross section of the body portion 13 or the bottom portion 14.

Subsequently, a blow molding device 100 for manufacturing a container is described with reference to FIG. 2. FIG. 2 is a block diagram of the blow molding device 100.

As shown in FIG. 2, the blow molding device 100 includes an injection molding part 110 for manufacturing a preform 20, and a temperature adjustment part 120 for adjusting a temperature of the manufactured preform 20. The injection molding part 110 is connected to an injection device 112 configured to supply a resin material that is a raw material. A synthetic resin that is a raw material is a thermoplastic resin, and can be selected as appropriate depending on uses. Examples of the synthetic resin include PET (polyethylene terephthalate), PEN (polyethylene naphthalate), PCTA (polycyclohexanedimethylene terephthalate), Tritan (tritan: copolyester), PP (polypropylene), PE (polyethylene), PC (polycarbonate), PES (polyether sulfone), PPUS (polyphenyl sulfone), PS (polystyrene), COP/COC (cyclic olefin polymer), PMMA (polymethylmethacrylate: acrylic), PLA (polylactic acid), and the like. Biodegradable plastics can also be used. The blow molding device 100 also includes a blow molding part 130 for blowing the preform 20 to manufacture the container 10, and a take-out part 140 for taking out the manufactured container 10.

Figure 4A:
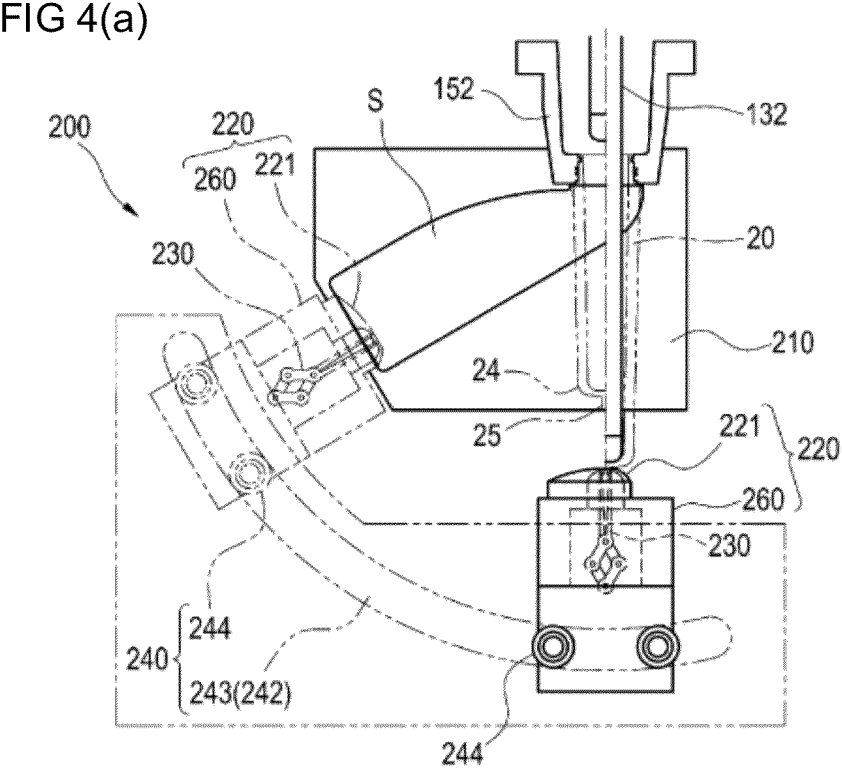
Figure 4B:
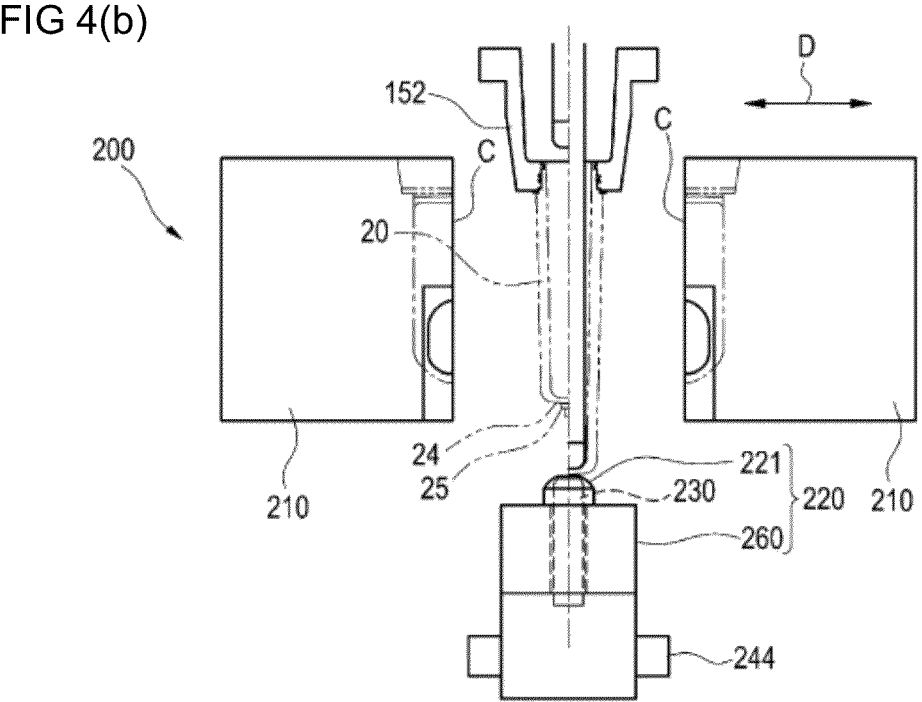
Figure 6A:
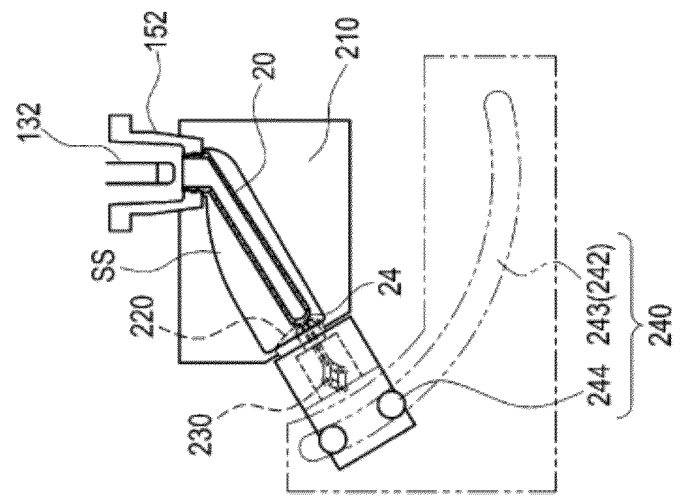
Figure 6B:
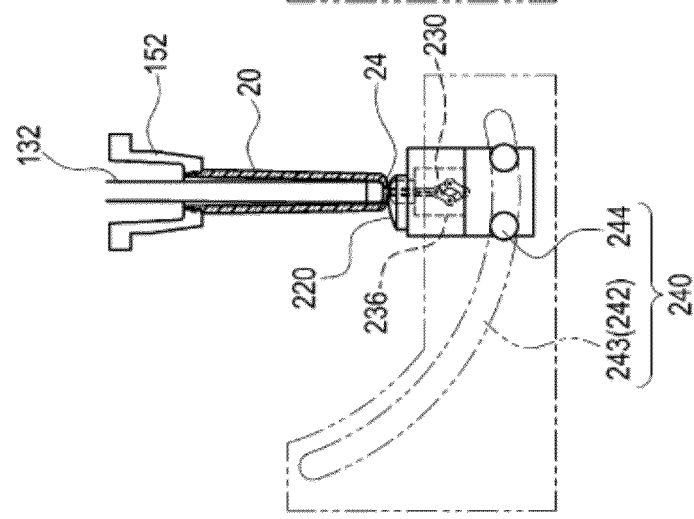
Figure 6C:
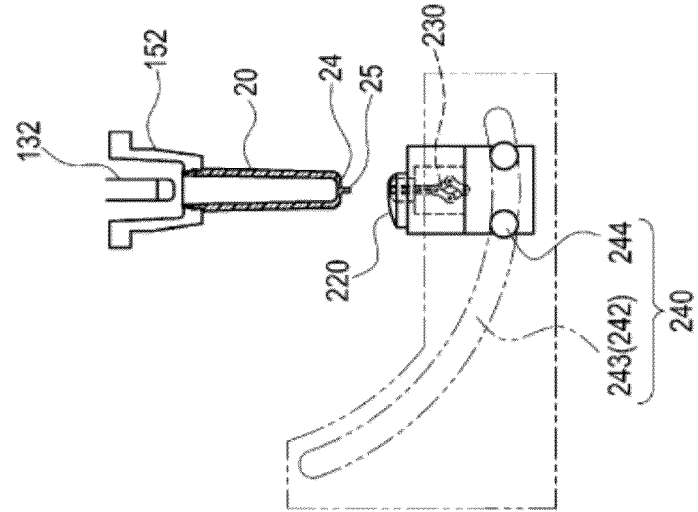
Figure 7A:
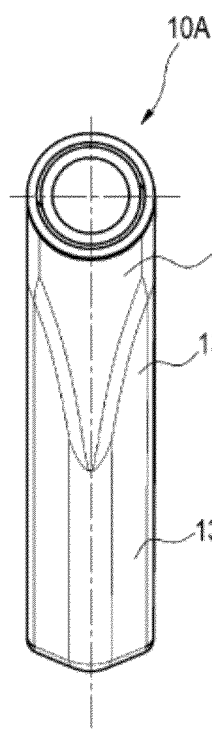
Figure 7B:
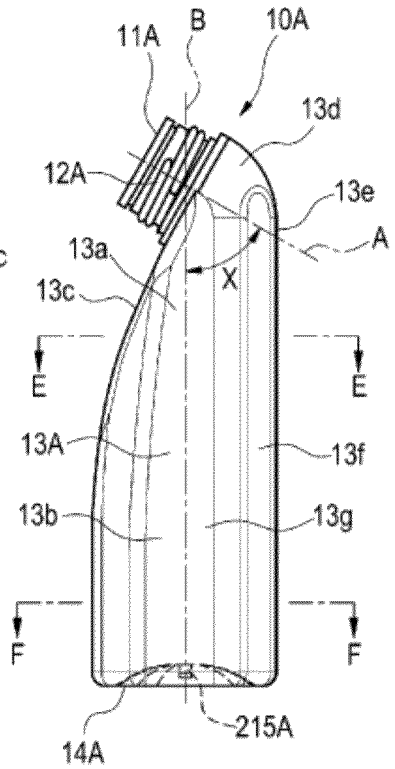
Figure 7C:
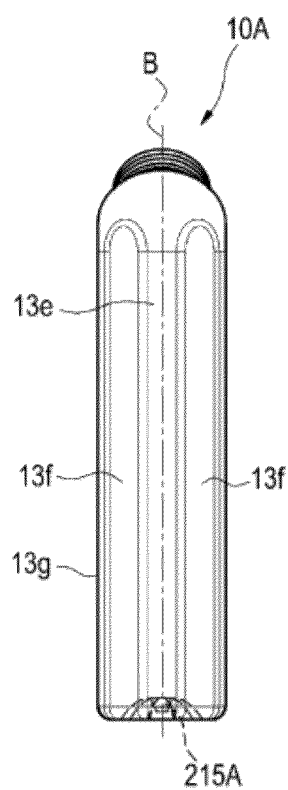
Figure 7D:
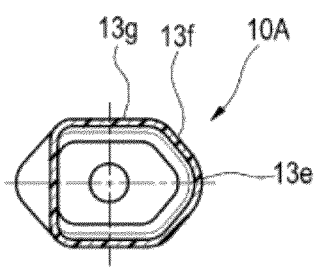
Figure 7E:
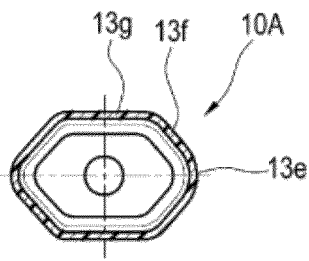

The injection molding part 110, the temperature adjustment part 120, the blow molding part 130 and the take-out part 140 are provided at positions rotated by predetermined angles (in the present embodiment, 90°) about a conveying means 150. The conveying means 150 includes a rotation plate and the like, and is configured such that the preform 20 or the container 10 in a state where the neck portion 22 or 12 is supported by neck molds 152 attached to the rotation plate is conveyed to each part as the rotation plate is rotated, as shown in FIGS. 4 and 6.

The injection molding part 110 shown in FIG. 2 has an injection cavity mold, an injection core mold, a neck mold and the like, which are not shown. By causing the resin material to flow from the injection device 112 into a preform-shaped space formed by mold-clamping the molds, a bottomed preform 20 is manufactured.

The preform 20 of the present embodiment is described with reference to FIG. 3. (a) of FIG. 3 is a front view of the preform 20, (b) of FIG. 3 is a right side view of the preform 20, (c) of FIG. 3 is a partially enlarged front view of the preform 20, and (d) of FIG. 3 is a partially enlarged right side view of the preform 20. The preform 20 includes a neck portion 22 having an opening 21, a body portion 23 formed to be continuous to the neck portion 22 and defining a sidewall part of the preform 20, and a bottom portion 24 formed to be continuous to the body portion 23. A central portion of the bottom portion 24 is provided with a projecting portion 25. The projecting portion 25 includes a gate portion 26 close to an injection gate for a resin during preform molding, and a protruding portion 27 formed on a further upper side than the gate portion 26 in the vertical direction and continuous to a lower end of the preform 20. The protruding portion 27 has a flat shape, a diameter thereof is larger than (a width thereof is larger than) that of the gate portion 26 in a front view ((a) and (c) of FIG. 3), and a width thereof is equivalent to that of the gate portion 26 in a side view ((b) and (d) of FIG. 3). That is, a length of the protruding portion 27 in a right and left direction (a right and left direction on the drawing sheet of (a) and (b) of FIG. 3; a wide width direction in which the protruding portion 27 is seen wider than the gate portion 26 in a state where the preform 20 is supported by the neck molds 152) is longer than a length of the gate portion 26 in the right and left direction on the drawing sheet of (a) and (b) of FIG. 3. A length of the protruding portion 27 in a front and rear direction (a right and left direction on the drawing sheet of (b) and (d) of FIG. 3; a direction in which a width of the protruding portion 27 is seen equal to a width of the gate portion 26 in a state where the preform 20 is supported by the neck molds 152) is equivalent to a length of the gate portion 26 in the front and rear direction.

Returning to FIG. 2, the blow molding device 100 is described. The temperature adjustment part 120 is configured to adjust a temperature of the preform 20 manufactured in the injection molding part 110 to a temperature suitable for final blow. The blow molding part 130 is configured to perform blow molding on the preform 20 whose temperature has been adjusted by the temperature adjustment part 120, thereby manufacturing the container 10 made of resin. The blow molding part 130 has a blow molding mold 200 and a stretch rod 32.

Here, the blow molding mold 200 of the blow molding part 130 is described in detail with reference to FIG. 4. (a) of FIG. 4 is a front view of the mold 200, and (b) of FIG. 4 is a left side view of the mold 200. The mold 200 has a pair of split molds (blow cavity split molds) 210, a bottom mold 220, a pair of neck molds 152, a holding mechanism 230, and a rotation mechanism 240.

The split molds 210 are configured to open and close in the right and left direction (opening and closing direction D), based on parting surfaces C, in a side view ((b) of FIG. 4). The pair of left and right split molds 210 configures a space S for defining the body portion 13 of the container 10, in a closed state.

The bottom mold 220 includes a first bottom mold member 221 configured to define the bottom portion 14 of the container 10, and a second bottom mold member (accommodation block) 260 arranged below the first bottom mold member 221. In the bottom mold 220, the holding mechanism 230 is provided so as to be accommodated therein ((a) and (b) of FIG. 4). In the first bottom mold member 221, at least a part of a holding portion 232 (which will be described later) of the holding mechanism 230 is accommodated, and in the second bottom mold member 260, at least a part of an opening and closing mechanism 234 (which will be described later) of the holding mechanism 230 is accommodated. The second bottom mold member 260 is provided on an upper surface of a guided part 244, which will be described later. The bottom mold 220 and the guided part 244 (which will be described later) are integrally configured to be movable along a guide part 242 (which will be described later).

Figure 5:
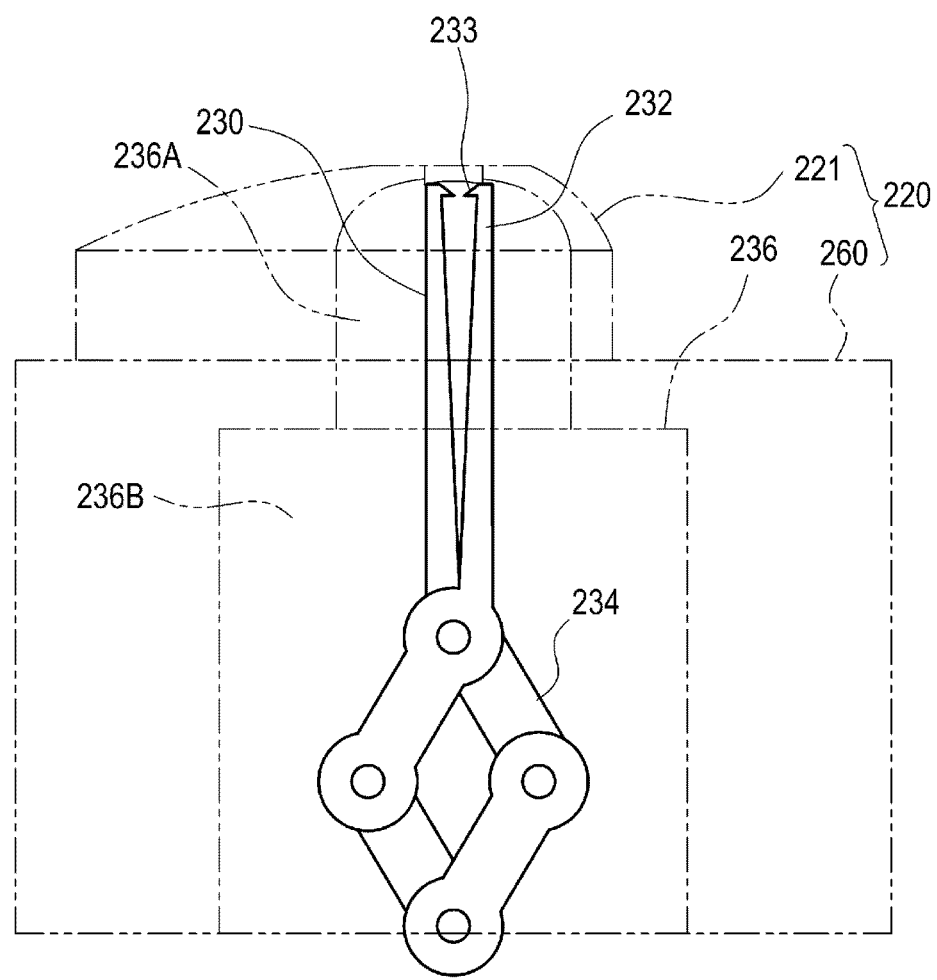
FIG. 5 depicts a holding mechanism.

Here, the holding mechanism 230 is described with reference to FIG. 5. The holding mechanism 230 has a holding portion 232 configured to be capable of gripping the protruding portion 27 of the projecting portion 25 provided to the bottom portion 24 of the preform 20. The holding portion 232 is provided independently from the bottom mold 220 (separately provided without being directly provided to the bottom mold 220). The holding portion 232 is configured to be openable and closable by a drive member (opening and closing mechanism 234) connected via a link mechanism at the lower part of the bottom mold 220, and holds the protruding portion 27 by changing from an opened state to a closed state. A tip end of the holding portion 232 is provided with a claw portion 233 protruding inward from the holding portion 232, and the claw portion 233 is configured to bite the protruding portion 27 in a state where the holding portion 232 is closed.

The first bottom mold member 221 includes a first accommodation part 236A. The second bottom mold member 260 includes a second accommodation part 236B. As used herein, a part having the first accommodation part 236A and the second accommodation part 236B is defined as an accommodation part 236. Note that, the first accommodation part 236A and the second accommodation part 236B communicate with each other. The accommodation block 260 and the bottom mold 220 are each provided with an opening portion for guiding the projecting portion 25 of the preform 20 to the holding portion 232. The holding portion 232 and the opening and closing mechanism 234 are covered by the accommodation part 236. In the accommodation part 236, the holding mechanism 230 is arranged.

Returning to FIG. 4, the mold 200 is described. As described above, the preform 20 or the container 10 is conveyed to each part as the rotation plate is rotated, in a state where the neck molds 152 are attached to the rotation plate and support the neck portion 12, 22. The rotation mechanism 240 has a guide part 242 arranged on a side of the bottom mold 220 and below the split molds 210 and having a flat shape and a cam groove 243, and a guided part (cam follower) 244 connected to a moving block (not shown) fixed just below the accommodation part 236 ((a) of FIG. 4). The cam groove 243 of the guide part 242 has at least a curved portion, and is provided with a linear portion, as required. The curved portion has one end portion in the vertical direction below the preform 20 conveyed from the temperature adjustment part 120 by the rotation plate. The guided part 244 is moved along the curved portion, so that the body portion 23 and the bottom portion 24 of the preform 20 are rotated relative to the neck portion 22 by a predetermined angle (for example, 60°) corresponding to the inclination angle X of the container 10. Note that, during this operation, the neck portion 22 is immovably supported by the neck molds and the like.

The rotation mechanism 240 is configured to be capable of moving the guided part 244 along the cam groove 243 of the guide part 242, thereby rotating the bottom mold 220 relative to positions at which the neck molds 152 are arranged during blow molding, via the moving block. That is, the rotation mechanism 240 is configured to be capable of rotating the bottom mold 220, relative to the neck portion 22 of the preform 20 in a stationary state held by the neck molds 152, in a state where the protruding portion 27 is gripped by the holding mechanism 230. The rotation mechanism 240 is also configured to be capable of rotating the bottom mold 220 on a plane orthogonal to the opening and closing direction D of the split molds 210 of the mold 200. In other words, the rotation mechanism 240 is configured to be capable of rotating the bottom mold 220 along the parting surfaces C of the split molds 210. That is, the bottom mold 220 is moved from a first position corresponding to a central axis direction of the body portion 23 of the preform 20 which is not bent (is straight), to a second position corresponding to a central axis direction of the body portion 23 of the preform 20 which is bent (curved). Note that, the rotation mechanism 240 can also be referred to as a swing mechanism or an oscillation mechanism.

Again back to FIG. 2, the take-out part 140 of the blow molding device 100 is described. The take-out part 140 is configured to take out the container 10 by removing the neck portion 12 of the container 10 manufactured in the blow molding part 130 from the neck molds 152.

Subsequently, a blow molding method of the container 10 in the blow molding part 130 of the blow molding device 100 is described with reference to FIG. 6. (a) of FIG. 6 depicts an aspect where the preform 20 is accommodated in the mold 200 in a state where the split molds 210 (not shown) are opened, (b) of FIG. 6 depicts a state where the protruding portion 27 of the preform 20 is gripped by the holding mechanism 230, and (c) of FIG. 6 depicts a state where the preform 20 is bent. In the present embodiment, the blow molding process includes a holding process of gripping the protruding portion 27 of the preform 20 accommodated in the mold 200 by the holding mechanism 230 of the mold 200, in a state where the split molds 210 of the mold 200 are opened; a bending process of bending the preform 20 by rotating the bottom mold 220 which is gripping the protruding portion 27 relative to the neck portion 22 of the preform 20 which is in a stationary state held by the neck molds 152; and a blowing process of closing the split molds 210 and stretching the preform 20 by a pressurizing medium.

First, the preform 20 supported by the neck molds 152 and adjusted to a temperature suitable for blow molding in the temperature adjustment part 120 is conveyed to the blow molding part 130 by the conveying means 150 and is accommodated in the mold 200 in a state where the split molds 210 are opened ((a) of FIG. 6). Then, the stretch rod 132 provided to the blow molding part 130 and located at a standby position is moved down to press the bottom portion 24 of the preform 20 from an inside thereof, thereby stretching the preform 20 toward the bottom mold 220 (preliminary stretching process). The preform 20 is stretched to the bottom mold 220, so that the projecting portion 25 of the bottom portion 24 is accommodated in the opening portions of the bottom mold 220 and the accommodation part 236 ((b) of FIG. 6). The protruding portion 27 of the accommodated projecting portion 25 is gripped by the holding mechanism 230, and the bottom mold 220 of the mold 200 and the bottom portion 24 of the preform 20 are connected to each other (holding process). Thereafter, the stretch rod 132 is moved up to the standby position.

Subsequently, the guided part 244 attached to the bottom mold 220 is moved obliquely in an upper left direction in (b) of FIG. 6 along the cam groove 243 of the guide part 242 by the rotation mechanism 240. Thereby, the bottom mold 220 gripping the protruding portion 27 is rotated relative to the neck portion 22 of the preform 20 in a stationary state held by the neck molds 152 ((c) of FIG. 6). Thereby, a part of the body portion 23 close to the neck portion 22 of the preform 20 is bent (bending process). Then, the split molds 210 are closed to accommodate the bent preform 20 in the space S defining an outer shape of the container 10 configured by the neck molds 152, the split molds 210 and the bottom mold 220. In this state, the pressurizing medium such as air is introduced into the preform 20 to blow and stretch the preform 20, so that the container 10 is molded (blowing process). After the molding, the split molds 210 are opened to release the container 10, and the container 10 is conveyed to the take-out part 140 by the conveying means 150. By the above method, it is possible to form the container 10 with a bent neck from the preform 20 by blow molding.

In the meantime, a container where an inclination angle of a neck portion is small can also be manufactured by the stretch blow molding using the inclination stretch mechanism disclosed in Patent Literature 1, Patent Literature 2 and Patent Literature 3. However, in the inclination stretch mechanism, it is necessary to bring a tip end of a stretch rod into contact with an inner wall surface of a bottom portion of a preform before introduction of blow air. Therefore, since it is substantially impossible for a container where an inclination angle of a neck portion is large (for example, 60° or larger) to satisfy the condition, such container is manufactured by the direct blow molding.

On the other hand, the container that can be manufactured by the direct blow molding is generally inferior to the container manufactured by the stretch blow molding in terms of aesthetic appearance. In addition, there are concerns such as poor welding (pinholes) at a pinch-off portion of the bottom portion of the container, dimensional accuracy of the neck portion is not high (airtightness is not good) because the neck portion of the container is also shaped by air blow, burrs should be removed and an amount of useless resin (loss material) is large, a post-process referred to as trimming on a cut surface is necessary even after blow molding, and a container with high surface gloss is difficult to be manufactured.

The blow molding mold 200 according to the embodiment includes the holding mechanism 230 independently provided to the bottom mold 220 and configured to be capable of gripping the protruding portion 27 provided to the bottom portion 24 of the preform 20 independently of the gate portion 26, and the rotation mechanism 240 configured to be capable of rotating the bottom mold 220, relative to the neck portion 22 of the preform 20 which is in a stationary state held by the neck molds 152, in a state where the protruding portion 27 is gripped by the holding mechanism 230. According to the blow molding mold 200 configured as described above, it is possible to manufacture the container 10 with a bent neck having a large inclination angle by the stretch blow molding. Thereby, it is possible to manufacture the container 10 with a bent neck, whose neck portion 12 has a large inclination angle, such that the container 10 has an excellent aesthetic appearance, without considering the problems of the direct blow molding.

In the blow molding mold 200 according to the embodiment, the bottom mold 220 is configured to be capable of rotating on the plane orthogonal to the opening and closing direction D of the split molds 210 of the mold 200 by the rotation mechanism 240. In other words, the bottom mold 220 is configured to be capable of rotating along the parting surfaces C of the split molds 210. When the bottom mold 220 is configured to be capable of rotating on the plane orthogonal to the opening and closing direction D of the split molds 210, it is possible to reduce a movable width necessary for the split molds 210 to move and to save the space, as compared to an aspect where the bottom mold 220 is configured to move in the opening and closing direction D of the split molds 210. Also, a thickness of the mold 200 can be reduced, which is advantageous in terms of thermal efficiency.

The blow molding method of the embodiment includes the holding process of gripping the protruding portion 27, which is provided to the bottom portion 24 of the preform 20 independently of the gate portion 26, by the holding mechanism 230 independently provided to the bottom mold 220 of the blow molding mold 200, and the bending process of bending the preform 20 by rotating the bottom mold 220 which is gripping the protruding portion 27 relative to the neck portion 22 of the preform 20 which is in a stationary state held by the neck molds 152. According to the blow molding method configured as described above, it is possible to manufacture the container 10 with a bent neck having a large inclination angle by a method other than the direct blow molding. Thereby, it is possible to manufacture the container 10 with a bent neck, whose neck portion 12 has a large inclination angle, such that the container 10 has an excellent aesthetic appearance, without considering the problems of the direct blow molding.

The blow molding method of the embodiment further includes the preliminary stretching process of stretching the bottom portion 24 of the preform 20 toward the bottom mold 220 by the stretch rod 132. According to the blow molding method of the container 10 configured as described above, it is possible to manufacture the container 10 with a bent neck having a large inclination angle by the stretch blow molding.

In the embodiment, the protruding portion 27 that is held by the holding mechanism 230 is provided on a further upper side than the gate portion 26 and the diameter thereof is increased to be thick in the width direction. Thereby, the holding of the protruding portion 27 by the holding mechanism 230 is stable, and when rotating the bottom mold 220 by the rotation mechanism 240, the preform 20 can be favorably prevented from separating from the holding mechanism 230. Also, the shape of the preform can be easily changed by appropriately changing a size of the protruding portion 27.

In the embodiment, the holding portion 232 is provided independently of the bottom mold 220, and is configured to be openable and closable by the drive member (opening and closing mechanism 234) connected via the link mechanism at the lower part of the bottom mold 220. Thereby, it is possible to firmly hold the protruding portion 27 by the holding portion 232, and when rotating the bottom mold 220 by the rotation mechanism 240, the preform 20 can be favorably prevented from separating from the holding mechanism 230.

In the embodiment, the holding portion 232 of the holding mechanism 230 is provided with the claw portion 233. By providing the claw portion 233, it is possible to firmly hold the protruding portion 27, and when rotating the bottom mold 220 by the rotation mechanism 240, the preform 20 can be favorably prevented from separating from the holding mechanism 230.

Subsequently, an aspect of a resin container according to the embodiment is described with reference to FIG. 7. FIG. 7 depicts an aspect of a container 10A that is an aspect of the container with a bent neck having a large inclination angle. (a) of FIG. 7 depicts the container 10A as seen from an opening-side, (b) of FIG. 7 depicts a front appearance of the container 10A, (c) of FIG. 7 depicts a right side appearance of the container 10A, (d) of FIG. 7 is a sectional view of the container 10A taken along a line E-E, and (e) of FIG. 7 is a sectional view of the container 10A taken along a line F-F.

A basic aspect of the container 10A is similar to the container 10 but details are described including possible variations of the inclination angle X, the size of the container and the like. The container 10A is a container made of resin and includes a neck portion 12A having an opening 11A, a body portion 13A formed to be continuous to the neck portion 12A and defining a sidewall part of the container 10A, and a bottom portion 14A formed to be continuous to the body portion 13A (refer to the aspect of the container 10 shown in FIG. 1). The bottom portion 14A has an outer edge portion formed to have a horizontal surface shape and serving as a ground contacting surface, and an upper bottom portion depressed toward the body portion 13A and forming a concave portion. An inclination angle X between an axis A passing through a center of the opening 11A of the neck portion and orthogonal to an opening surface and an axis B extending in a vertical direction of the container is within a range of 50° to 80°. The inclination angle X is preferably within a range of 60°±5° or 60° to 70°.

As shown in (d) and (e) of FIG. 7, a traverse section in the horizontal direction of the body portion 13A of the container 10A has a substantially flat shape so that a neck bending direction can be perceived when the container is gripped and used. In other words, the traverse section of the body portion 13A of the container 10A has such a shape that a width (a length in the upper and lower direction of the body portion on the drawing sheet of (d) and (e) of FIG. 7) and a depth (a length in the right and left direction of the body portion on the drawing sheet of (d) and (e) of FIG. 7) of the body portion 13A are different from each other. From the difference between the width and the depth, the neck bending direction can be perceived. The container 10A of FIG. 7 has such a shape that the width is smaller than the depth. A direction extending in a horizontal diametrical direction of the opening 11A may also be referred to as the width direction of the container and a direction in which an axis orthogonal to the opening surface formed by the opening 11A extends may also be referred to as the depth direction of the container.

The body portion 13A of the container 10A has an upper body portion 13*a* whose depth (a width in the right and left direction on the drawing sheet of (b) of FIG. 7) is gradually wider downward and a lower body portion 13*b* having substantially the same diameter continuing from the upper body portion. The upper body portion 13a has an inclined portion 13c inclined in a direction substantially orthogonal to the axis A and a curved portion 13d (shoulder portion) bent to extend in the vertical direction as it is distant from the neck portion 12A. The body portion 13A of the container 10A also has a first vertical surface portion 13e, second vertical surface portions 13f and a third vertical surface portion 13g, which are surface-shaped portions extending in the vertical direction. The first vertical surface portion 13e is a substantially planar portion positioned at a center of the body portion 13A and extending from the bottom portion 14A to the neck portion 12A of the container 10A, when the container 10A is seen from the right ((c) of FIG. 7). The two second vertical surface portions 13f are present with the first vertical surface portion 13e being sandwiched therebetween and are each a substantially planar portion extending from the bottom portion 14A to the curved portion 13d, when the container 10A is seen from the right ((c) of FIG. 7). The third vertical surface portion 13g is a substantially planar portion adjacent to each of the second vertical surface portions 13f at positions of the second vertical surface portions 13f opposite to the first vertical surface portion 13e ((b) of FIG. 7) and extending from the bottom portion 14A to the neck portion 12A. The inclined portion 13c, the first vertical surface portion 13e, the second vertical surface portions 13f and the third vertical surface portion 13g are provided, so that a sectional shape of the body portion 13A is substantially hexagonal ((e) of FIG. 7) in the vicinity of the bottom portion 14A (F-F section) and is substantially pentagonal ((d) of FIG. 7) in the vicinity of the neck portion 12A (E-E section). Note that, the first, second and third vertical surface portions 13e, 13f and 13g mean first, second and third planar portions extending in the vertical direction, respectively.

An outer surface of the bottom portion 14A of the container 10A (an outer surface of the upper bottom portion) is provided with a projecting portion 215A (projection trace portion) projecting outward from the bottom portion 14A (protruding downward in the vertical direction). The projecting portion 215A (projection trace portion) is formed to be within a range of a depth of the depression of the bottom portion 14A (a depth of the upper bottom portion). The container 10A can be molded using the mold 200 and the preform 20 described in the above embodiment. The projecting portion 215A is a portion formed as the projecting portion 25 of the preform 20 remains after the molding of the container 10A. That is, similarly to the projecting portion 25 of the preform 20, at least the protruding portion 27 remains on the projecting portion 215A of the container 10A (not shown). The projecting portion 25 provided to the preform 20 for molding the container 10A is provided on the central axis of the preform 20. Thereby, in the mold 200, the preform can be stretched with the stretch rod 132, so that the projecting portion 25 can be favorably gripped with the holding mechanism 230. Therefore, the projecting portion 215A is formed with a concave portion that is a trace of holding by the holding mechanism 230. The projecting portion 215A of the container 10A formed by bending the preform 20 may not be provided at the center of the container 10A. For example, the projecting portion may be offset (deviate from the center) with respect to the center of the bottom portion of the container 10A. Note that, considering an outer shape of the container 10A, the projecting portion 215A of the container 10A may be removed by cutting, for example (also in this case, the projecting portion 215A remains slightly). The container 10A has a height of 10 to 20 cm (preferably, 13 cm±3 cm), a width of 2 to 6 cm (preferably, 3±1 cm) and a depth of 3 to 10 cm (preferably, 4±1 cm).

As described above, the body portion 13A of the container 10A is formed to have a polygonal shape, so that the rigidity and grip ability of the container 10A are improved. Also, the projecting portion 215A is formed to be within the range of the depth of the depression of the bottom portion 14A, so that the ground contacting stability of the container 10A can also be secured.

The present invention is not limited to the embodiments and can be modified and improved as appropriate. In addition, the materials, shapes, dimensions, numerical values, forms, number, arrangement places and the like of the respective constitutional elements of the embodiments are arbitrary and are not particularly limited as long as the present invention can be implemented.

In the embodiment, the container 10 with a bent neck having the inclination angle of about 60° has been described. However, according to the mold 200 and the blow molding method of the present embodiment, even a container having the inclination angle equal to or larger than 60° or equal to or smaller than 60° C. an be manufactured by the stretch blow molding. In addition, the operation of the rotation mechanism 240 may also be an operation configured by horizontal movement and linear/multi-step obliquely upward movement as well as the rotation.

In the embodiments, air has been exemplified as the pressurizing medium for blowing the preform 20. However, a gas medium other than air may also be used, and a liquid medium such as water can also be used for pressurization.

The subject application is based on Japanese Patent Application No. 2018-134579 filed on Jul. 17, 2018, the contents of which are incorporated herein by reference. Also, all references cited therein are entirely included herein.

REFERENCE SIGNS LIST

10: container with a bent neck, 11: opening, 12: neck portion, 13: body portion, 14: bottom portion, 20: preform, 21: opening, 22: neck portion, 23: body portion, 24: bottom portion, 25: projecting portion, 26: gate portion, 27: protruding portion, 100: blow molding device, 110: injection molding part, 112: injection device, 120: temperature adjustment part, 130: blow molding part, 132: stretch rod, 140: take-out part, 150: conveying means, 152: neck mold, 200: blow molding mold, 210: split molds, 220: bottom mold, 230: holding mechanism, 232: holding portion, 233: claw portion, 234: opening and closing mechanism, 236: accommodation part, 240: rotation mechanism, 242: guide part, 244: guided part

The invention claimed is:
1. A container made of resin, the container comprising:
a neck portion having an opening;
a body portion continuous to the neck portion and defining a sidewall part; and
a bottom portion continuous to the body portion,
wherein an inclination angle between an axis passing through a center of the opening and orthogonal to an opening surface formed by the opening and an axis extending in a vertical direction of the container is equal to or larger than 50° and equal to or smaller than 80°,
wherein when a direction extending in a horizontal diametrical direction of the opening is referred to as a width direction of the container and a horizontal direc- tion orthogonal to the width direction is referred to as a depth direction of the container, a length in the width direction and a length in the depth direction of a horizontal section of the body portion are different from each other, wherein the bottom portion includes a projecting portion projecting outward from an outer surface of the bottom portion, wherein the projecting portion includes a gate portion formed at a tip end of the projecting portion and a protruding portion formed at a position closer to the bottom portion than the gate portion, and wherein the protruding portion has a flat shape.

2. The container according to claim 1, wherein the body portion includes an upper body portion having an inclined surface portion inclined along a direction orthogonal to an axis orthogonal to the opening surface formed by the opening and a lower body portion connected to the upper body portion and extending in the vertical direction, wherein horizontal sections of the upper body portion and the lower body portion have polygonal shapes, and wherein a number of corners of the polygonal shape of the horizontal section of the upper body portion is smaller than a number of corners of the polygonal shape of the horizontal section of the lower body portion.

3. The container according to claim 1, wherein the body portion includes an upper body portion having an inclined surface portion inclined along a direction orthogonal to an axis orthogonal to the opening surface formed by the opening and a lower body portion connected to the upper body portion and extending in the vertical direction, wherein horizontal sections of the upper body portion and the lower body portion have polygonal shapes, and wherein a number of corners of the polygonal shape of the horizontal section of the upper body portion is smaller than a number of corners of the polygonal shape of the horizontal section of the lower body portion.

4. The container according to claim 1, wherein the flat shape is configured such that a width of the protruding portion is larger than a width of the gate portion in a first direction, and a width of the protruding portion is equal to a width of the gate portion in a second direction, orthogonal to the first direction.

5. A blow molding method comprising:

gripping a protruding portion, which is provided to a bottom portion of a preform accommodated in a blow molding mold independently of a gate portion, by a holding mechanism independently provided to a bottom mold of the blow molding mold, in a state where split molds of the blow molding mold are opened;

bending the preform by rotating the bottom mold which is gripping the protruding portion relative to a neck portion of the preform which is in a stationary state held by a neck mold; and closing the split molds and stretching the preform by a pressurizing medium so as to obtain the container according to claim 1.

6. The blow molding method according to claim 5, further comprising:

stretching the bottom portion of the preform toward the bottom mold by a stretch rod before the gripping of the protruding portion by the holding mechanism.

\* \* \* \* \*